(12) United States Patent
Xu et al.

(10) Patent No.: US 11,924,533 B1
(45) Date of Patent: Mar. 5, 2024

(54) VEHICLE-MOUNTED RECORDING COMPONENT AND VEHICLE-MOUNTED RECORDING DEVICE WITH CONVENIENT DISASSEMBLY AND ASSEMBLY

(71) Applicant: Shenzhen Luzhuo Technology Co., Ltd., Shenzhen (CN)

(72) Inventors: Huaixiu Xu, Shenzhen (CN); Huailiang Xu, Shenzhen (CN)

(73) Assignee: Shenzhen Luzhuo Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/356,918

(22) Filed: Jul. 21, 2023

(51) Int. Cl.
*H04N 23/54* (2023.01)
*B60R 11/04* (2006.01)
*H04N 5/907* (2006.01)

(52) U.S. Cl.
CPC ............. *H04N 23/54* (2023.01); *B60R 11/04* (2013.01); *H04N 5/907* (2013.01)

(58) Field of Classification Search
CPC ......... H04N 23/54; H04N 5/907; B60R 11/04
USPC ....................................................... 348/148
See application file for complete search history.

(56) References Cited

U.S. PATENT DOCUMENTS

| 5,963,872 A * | 10/1999 | Stein .................... H04B 1/3816 |
| 9,635,319 B1 * | 4/2017 | Englander ............ G06V 20/597 |
| 2009/0153312 A1 * | 6/2009 | Tanaka ................. G07C 5/0891 |
| | | 340/436 |
| 2011/0279675 A1 * | 11/2011 | Mano ..................... H04N 23/55 |
| | | 348/148 |
| 2012/0314884 A1 * | 12/2012 | Holman, III ........ H04L 65/1059 |
| | | 709/219 |
| 2017/0113225 A1 * | 4/2017 | Howell ................ G01N 21/272 |
| 2018/0091920 A1 * | 3/2018 | Family ................... H04S 1/005 |
| 2019/0083056 A1 * | 3/2019 | Abiri ........................ A61B 7/04 |
| 2021/0127532 A1 * | 4/2021 | Persson ................. H04N 23/57 |
| 2021/0197733 A1 * | 7/2021 | Percival ................ H04N 23/52 |
| 2021/0205757 A1 * | 7/2021 | Hoyda .................. B01D 53/30 |
| 2022/0159160 A1 * | 5/2022 | Abe ....................... H04N 23/54 |
| 2023/0072266 A1 * | 3/2023 | Steel .................. G06K 7/10366 |

FOREIGN PATENT DOCUMENTS

| CN | 103335853 A | 10/2013 |
| CN | 210133420 U | 3/2020 |
| CN | 212032194 U | 11/2020 |

* cited by examiner

*Primary Examiner* — Matthew David Kim
(74) *Attorney, Agent, or Firm* — Nitin Kaushik

(57) ABSTRACT

A vehicle-mounted recording component which is convenient to assemble and disassemble, including an image terminal for recording image and sounds, an operation terminal for outputting control instruction signals and a processing terminal for processing the recorded images and sounds according to the received control instruction signals, the processing terminal includes a circuit board and a guide structure capable of quickly installing the circuit board. The guide structure has a tapered guide hole and a tapered guide column that cooperate with each other; in case of installing a single-layer circuit board, the tapered guide hole and the tapered guide column are respectively arranged on the circuit board and the circuit board bracket; in case of installing a double-layer circuit board, the tapered guide hole and tapered guide column are respectively arranged on the two circuit boards.

13 Claims, 12 Drawing Sheets

VEHICLE-MOUNTED RECORDING COMPONENT AND VEHICLE-MOUNTED RECORDING DEVICE WITH CONVENIENT DISASSEMBLY AND ASSEMBLY

TECHNICAL FIELD

The present application relates to the technical field of vehicle-mounted recording, and in particular to a vehicle-mounted recording component and a vehicle-mounted recording device with convenient disassembly and assembly.

BACKGROUND

A vehicle-mounted recording component is mainly used to record the driving process, and is also used to obtain evidence of traffic accidents, so as to avoid being unable to determine the responsible party when an accident occurs. It is therefore an indispensable vehicle-mounted device in automobiles.

The existing vehicle-mounted recording component is complicated to assemble and disassemble. For example, vehicle-mounted recording components with single boards or double boards are all installed on the bracket by rotating screws or the double boards are installed together. Before installation, it is necessary to align two holes and then use a screwdriver to rotate the screws located inside the holes for fixation, which is complex to install and inconvenient to disassemble.

Based on the above reasons, it is urgent to design a vehicle-mounted recording component that is easy to install and disassemble.

SUMMARY

An object of the present application is to provide a vehicle-mounted recording component and a vehicle-mounted recording device which are convenient to disassemble and assemble, and aims to solve the problems of complicated installation and troublesome disassembly of the existing vehicle-mounted recording component.

In order to solve the above technical problems, the object of the present application is achieved through the following technical scheme:

A vehicle-mounted recording component with convenient disassembly and assembly, including:
  an image terminal for recording images and sounds;
  an operation terminal for outputting a control instruction signal;
  a processing terminal for processing the recorded images and sounds according to the received control instruction signal, which is respectively connected with the image terminal and the operation terminal, the processing terminal includes a circuit board and a guide structure capable of quickly installing the circuit board.

Specifically, the guide structure includes a tapered guide hole and a guide column slidably arranged in the tapered guide hole.

Further, the vehicle-mounted recording component with convenient disassembly and assembly includes a shielding structure capable of preventing the circuit board from radiating to the outside.

Further, the vehicle-mounted recording component with convenient disassembly and assembly includes a storage unit connected to the circuit board and capable of storing images and sounds.

Specifically, the storage unit includes a card holder with a card slot and a memory card slidably inserted in the card holder.

Further, a power supply capable of supplying power to the circuit board is provided on an outside of the circuit board, and the power supply is electrically connected to the circuit board.

Further, the outside of the circuit board is further provided with a sound connector and a signal transceiver connector which are both electrically connected with the circuit board, the power supply and the sound connector are respectively arranged at two sides of the signal transceiver connector.

Further, the image terminal includes a lens board connector and a lens line connector which are electrically connected with the circuit board, the lens line connector may rotate relative to the lens board connector and be clamped on the lens board connector.

Specifically, the operation terminal includes a key board connector and a key wire connector electrically connected with the circuit board, the key wire connector rotates relative to the key board connector and is clamped on the key board connector.

Specifically, there are two circuit boards spaced apart, and the tapered guide holes and tapered guide columns are respectively arranged on the two circuit boards.

Preferably, there are two circuit boards spaced apart, and the tapered guide holes and tapered guide columns are respectively arranged on the two circuit boards.

Further, a built-in capacitor for emergency power supply is arranged in the circuit board.

Further, the circuit board is coated with a heat dissipation adhesive layer which is in contact with a rigid shielding structure.

Further, the processing terminal is connected with an external device through wired or wireless mode to transmit or receive video signals or audio signals.

A vehicle-mounted recording device, including a vehicle-mounted recording component which is convenient to assemble and disassemble according to any one of the above, and a housing which may accommodate the vehicle-mounted recording component. A soft rubber pad which may be adsorbed on the connecting surface is installed at a bottom of the housing.

A vehicle-mounted recording component which is convenient to assemble and disassemble, including an image terminal for recording image and sounds, an operation terminal for outputting control instruction signals and a processing terminal for processing the recorded images and sounds according to the received control instruction signals, the processing terminal includes a circuit board and a guide structure capable of quickly installing the circuit board. The guide structure has a tapered guide hole and a tapered guide column that cooperate with each other; in case of installing a single-layer circuit board, the tapered guide hole and the tapered guide column are respectively arranged on the circuit board and the circuit board bracket; in case of installing a double-layer circuit board, the tapered guide hole and tapered guide column are respectively arranged on the two circuit boards; after the tapered guide hole and the tapered guide column are matched, the circuit board may be quickly installed on the circuit board bracket or another circuit board, the installation is simple, the disassembly is convenient, the assembly process is reduced, and the production cost is reduced. Moreover, it avoids the following phenomenon in the conventional technology, that is, the vehicle-mounted recording component needs accurate hole alignment, and then the single circuit board is mounted on the bracket by rotating screws or the double circuit boards are mounted together, resulting in inconvenient disassembly and assembly. A vehicle-mounted recording device with a vehicle-mounted recording component is further provided according to the present application, which has good usability.

BRIEF DESCRIPTION OF DRAWINGS

In order to explain the technical scheme of this application more clearly, the drawings needed in the embodiments will be briefly introduced below. Obviously, the drawings described below are only some embodiments of this application. For ordinary technicians in this field, other drawings can be obtained according to these drawings without creative work.

Figure 1:
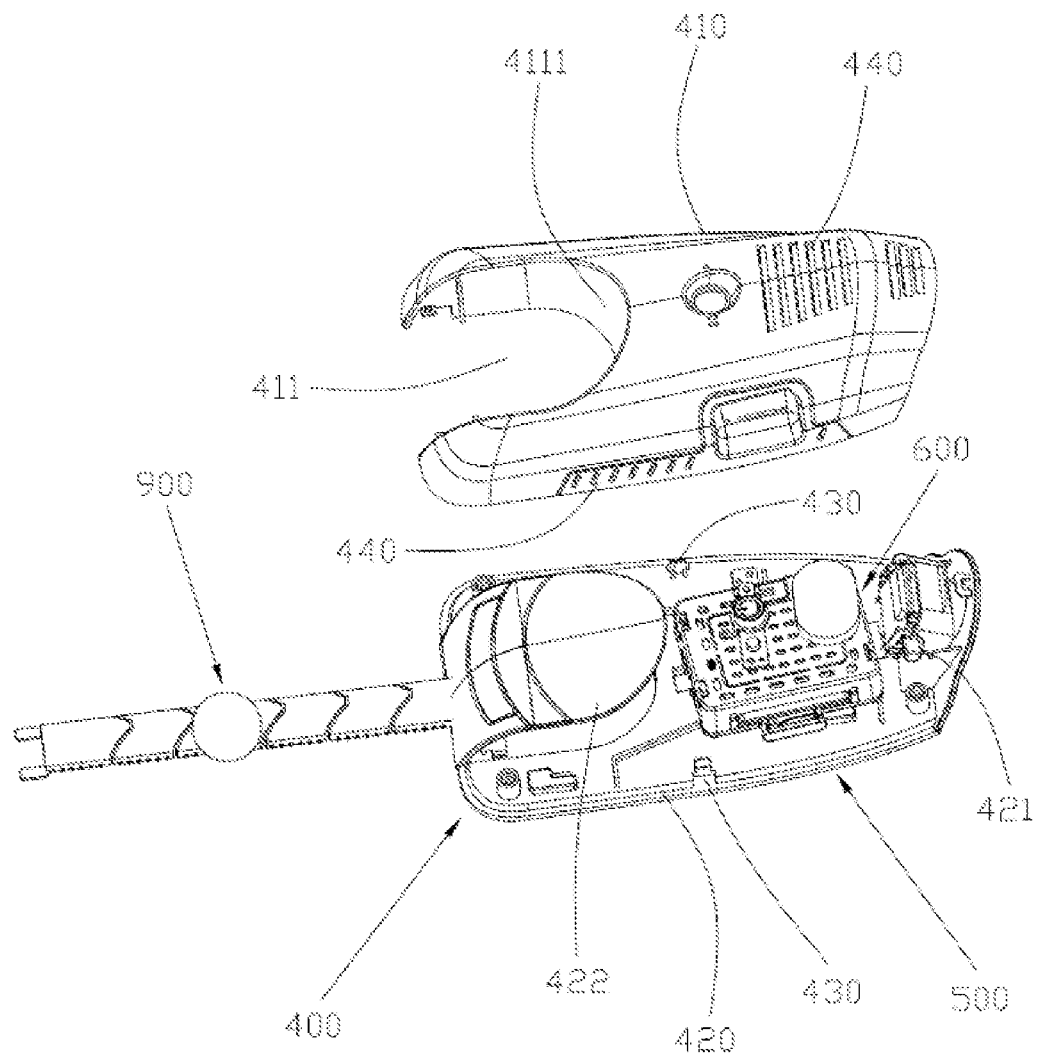
FIG. 1 is an exploded view of a vehicle-mounted recording component which is convenient to assemble and disassemble.

In this application, the component names and numbers are as follows:

image terminal 100, lens board connector 110, through hole 111, through groove 112, inner side surface 1211, outer side surface 113, guide surface 1231, rotating surface 114, lens line connector 120, large-end cylindrical body 121, small-end cylindrical body 122, projection 123, guide surface 1231, lens board connecting frame 130, second cable 140, third cable 150, lens sensor 160;

operation terminal 200, keypad connector 210, keypad wire connector 220, first cable 230, fourth cable 240, key 250;

processing terminal 300, circuit board 310, guide structure 320, tapered guide hole 321, tapered guide column 322, circuit board bracket 305, limit structure 306, limit plate 3061, guide shaft 3062, guide opening 3063, limit shaft 3064, sound connector 330, signal transceiver connector 340, speaker connector 360, antenna connector 370, built-in capacitor 380, heat dissipation adhesive layer 390;

housing 400, upper housing 410, lower housing 420, first clamping groove 411, inner side surface 4111, connecting shaft 421, elastic piece 422, clamping position 430;

soft rubber pad 500, exhaust hole 510;

shielding structure 600, upper shielding housing 610, second clamping groove 611, lower shielding housing 620, hook 621, support housing 630, second radiating hole 640, limiting boss 650, limiting groove 660;

storage unit 700, card holder 710, card slot 711;

power supply 800, power connector 810, capacitor connector 820, charging power supply 830;

telescopic wire 900.

DETAILED DESCRIPTION OF THE EMBODIMENTS

In the following, the technical scheme in the embodiment of the present application will be described clearly and completely with the attached drawings.

It should be noted that if there are directional indications (such as two ends, two sides, up, down, left, right, front and back) in the embodiment of the present invention, the directional indications are only used to explain the relative position relationship and movement situation among components in a certain posture (as shown in the attached figure), and if the specific posture changes, the directional indications will also change accordingly.

If there are descriptions related to "first" and "second" in the embodiment of this application, the descriptions of "first" and "second" are only used for descriptive purposes, and cannot be understood as indicating or implying their relative importance or implicitly indicating the number of indicated technical features. Therefore, the features defined as "first" and "second" can explicitly or implicitly include at least one of these features. In addition, the technical solutions of each embodiment can be combined with each other, but they must be based on the realization of ordinary technicians in the field. When the combination of technical solutions is contradictory or impossible, it should be considered that the combination of technical solutions does not exist and is not within the scope of protection required by this application.

As an example, a vehicle-mounted recording device includes a vehicle-mounted recording component and a housing that can accommodate the vehicle-mounted recording component.

As shown in FIG. 1 to FIG. 5, a vehicle-mounted recording device provided by an embodiment of the application includes a vehicle-mounted recording component which is convenient to assemble and disassemble, the vehicle-mounted recording component may be installed on automobiles to capture videos and record sounds, as well as on equipment such as trains, ships, submarines, and airplanes that require recording of images and sounds, the vehicle-mounted recording component includes:

an image terminal 100 for recording images and sounds, preferably a camera in this embodiment;

an operation terminal 200 for outputting a control instruction signal, which is preferably a control button in this embodiment;

a processing terminal 300 for processing the recorded images and sounds according to the received control instruction signal, which is respectively connected with the image terminal and the operation terminal, in this embodiment, the processing terminal is preferably a vehicle-mounted circuit board, the processing terminal 300 includes a circuit board 310 and a guide structure 320 capable of quickly installing the circuit board 310.

Specifically, the guide structure 320 includes a tapered guide hole 321 and a guide column 322 slidably arranged in the tapered guide hole 321. With this structure, a single circuit board 310 may be quickly installed on the circuit board bracket 305, or double-layer circuit boards 310 may be quickly installed together, which is simple to install and convenient to disassemble. In this embodiment, the number of tapered guide holes 321 and tapered guide columns 322 is preferably four, the tapered guide hole 321 and the tapered guide column 322 are respectively arranged at both ends of the two circuit boards 310. In this embodiment, an inner diameter of a large end of the tapered guide hole 321 is smaller than an outer diameter of a large end of the tapered guide column 322. Therefore, two circuit boards 310 may be spaced apart, which is beneficial to heat dissipation between the circuit boards 310 and prolongs the service life of the circuit boards 310. Moreover, it also avoids the phenomenon of requiring precise hole alignment before installation in existing technology, further improving installation efficiency.

As shown in FIG. 6 to FIG. 9, further, the vehicle-mounted recording component includes a limit structure 306 capable of limiting the circuit board 310, the limit structure 306 includes a limit plate 3061 which may rotate relative to the tapered guide column 322 for limiting the circuit board 310, the limit structure further includes a guide shaft 3062 fixed at the top of the tapered guide column 322, and the guide shaft 3062 is staggered with an axis of the tapered guide column 322. The guide shaft 3062 passes through a guide opening 3063 opened by a limit plate 3061, the limit plate 3061 rotates or translates to an upper surface of the circuit board 310 relative to the tapered guide column 322 and presses against the circuit board 310.

Preferably, a cross section of the guide opening 3063 is a hole or a long waist-shaped groove, in case that the cross section of the guide opening 3063 is a hole, the limit plate 3061 may rotate relative to the tapered guide column 322; in case that the cross section of the guide opening 3063 is a waist-shaped groove, the limit plate 3061 may translate relative to the top of the tapered guide column 322.

Further, the vehicle-mounted recording component further includes a limit shaft 3064 fixedly connected to the tapered guide column 322 and capable of longitudinally limiting and laterally moving the limit plate 3061.

In this embodiment, an axial length of the tapered guide column 322 is greater than or equal to an axial length of the tapered guide hole 321, so that the limit structure 306 may be installed at the top of the tapered guide column 322. It is also possible to set spacing between circuit board 310 and circuit board bracket 305, or between two circuit boards 310, which is conducive to timely heat dissipation of circuit board 310.

As an example, the housing structure is as follows:

including a housing 400 capable of accommodating a vehicle-mounted recording component, the housing 400 includes an upper housing 410 and a lower housing 420 detachably connected with the upper housing 410.

The specific structure of the detachable connection between the upper housing 410 and the lower housing 420 is:

one end of the lower housing 420 is longitudinally provided with a connecting shaft 421, and the other end of the lower housing 420 is provided with an elastic piece 422 bent towards the connecting shaft 421; one end of the upper housing 410 is provided with an arc groove (not shown) for accommodating the connecting shaft 421, and the other end of the upper housing 410 is provided with a first clamping groove 411 for accommodating the elastic piece 422. In case that the upper housing 410 is matched with the lower housing 420, the elastic piece 422 contacts an inner side surface 4111 of the first clamping groove 411, achieving longitudinal limit of the lower housing 420 on the upper housing 410;

the two sides of the upper housing 410 and the two sides of the lower housing 420 are respectively provided with clamping positions 430, which may be locked with each other after elastic deformation, the clamping position of the upper housing 410 in this embodiment is not shown.

The upper housing 410 and/or the lower housing 420 are both covered with a first heat dissipation hole 440, which facilitates the quick heat dissipation of the processing terminal 300.

Figure 10:
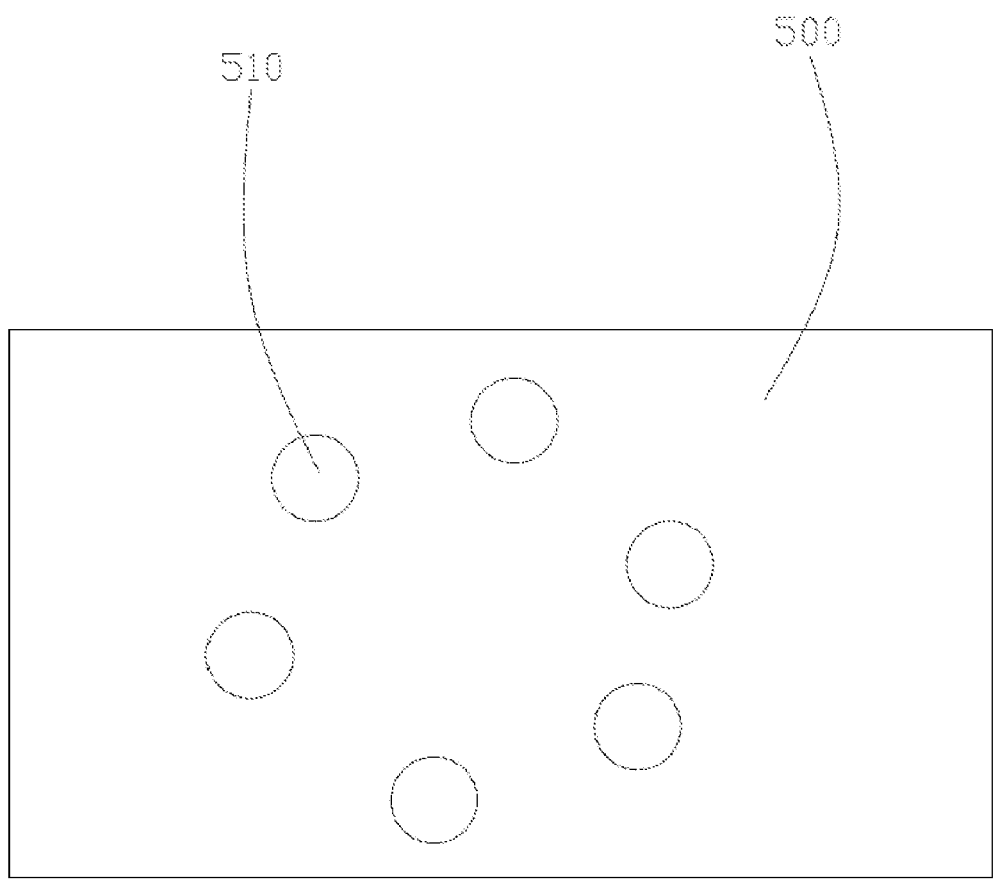
FIG. 10 is a schematic diagram of a flexible rubber pad in the vehicle-mounted recording component which is convenient to assemble and disassemble provided by the embodiment of the present application.

As shown in FIG. 10, in this embodiment, the bottom of the lower housing 420 is provided with a soft rubber pad 500 which may be sticked on the glass, and the soft rubber pad 500 is provided with exhaust holes 510 arranged in a ring shape. The exhaust hole may expel air between the lower housing 420 and the glass, enhancing the adsorption force of the soft rubber pad 500, and avoiding the phenomenon of the housing falling off the glass due to unstable connection.

Figure 2:
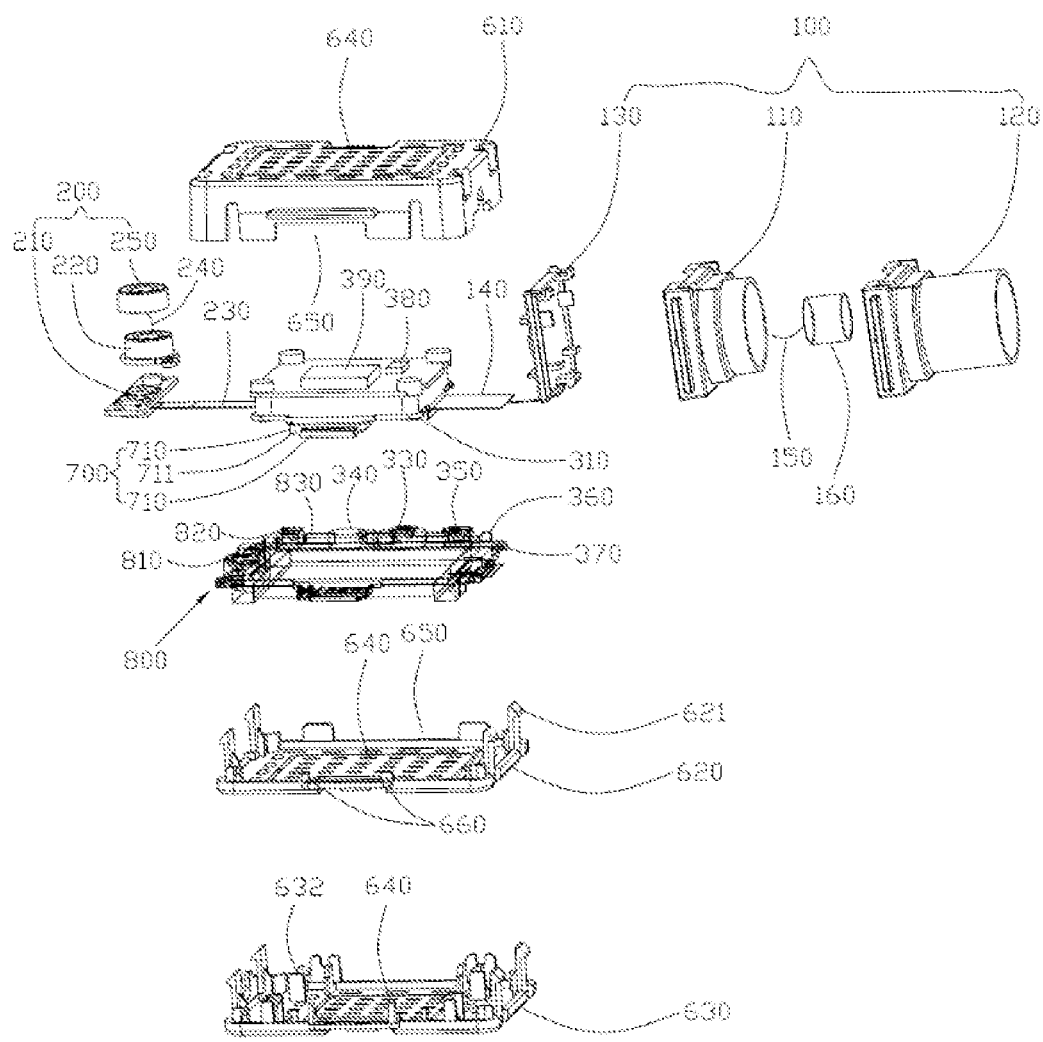
FIG. 2 is an exploded view of an image terminal, an operation terminal and a processing terminal in the vehicle-mounted recording component which is convenient to assemble and disassemble.
Figure 3:
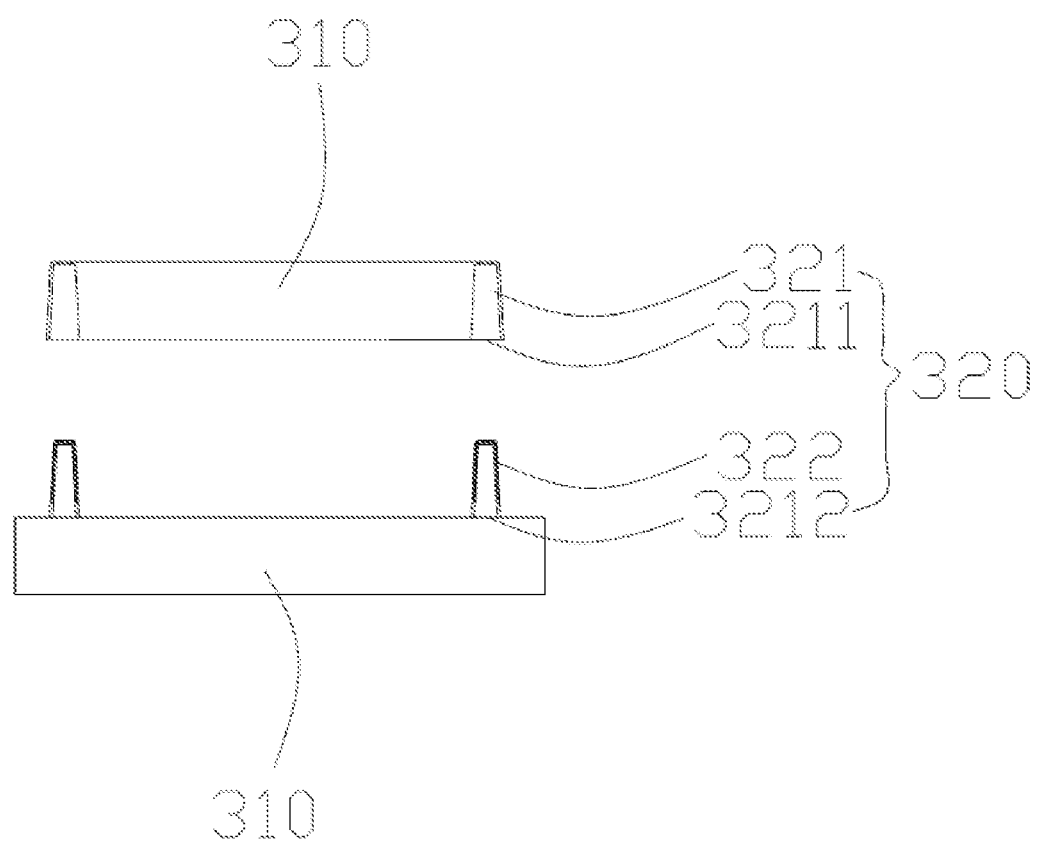
FIG. 3 is a schematic diagram of the separation of a double-layer circuit board in the vehicle-mounted recording component which is convenient to assemble and disassemble provided by an embodiment of the present application.
Figure 4:
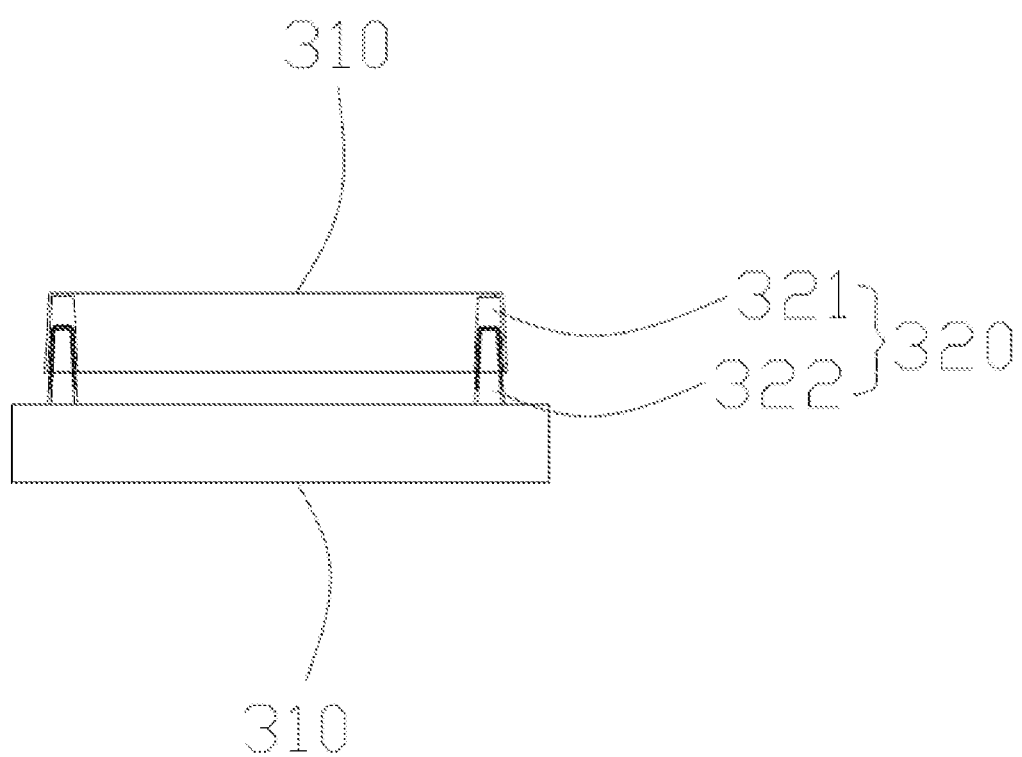
FIG. 4 is a schematic diagram showing that the double-layer circuit board in the vehicle-mounted recording component provided by the embodiment of the present application are installed together and spaced apart.
Figure 5:
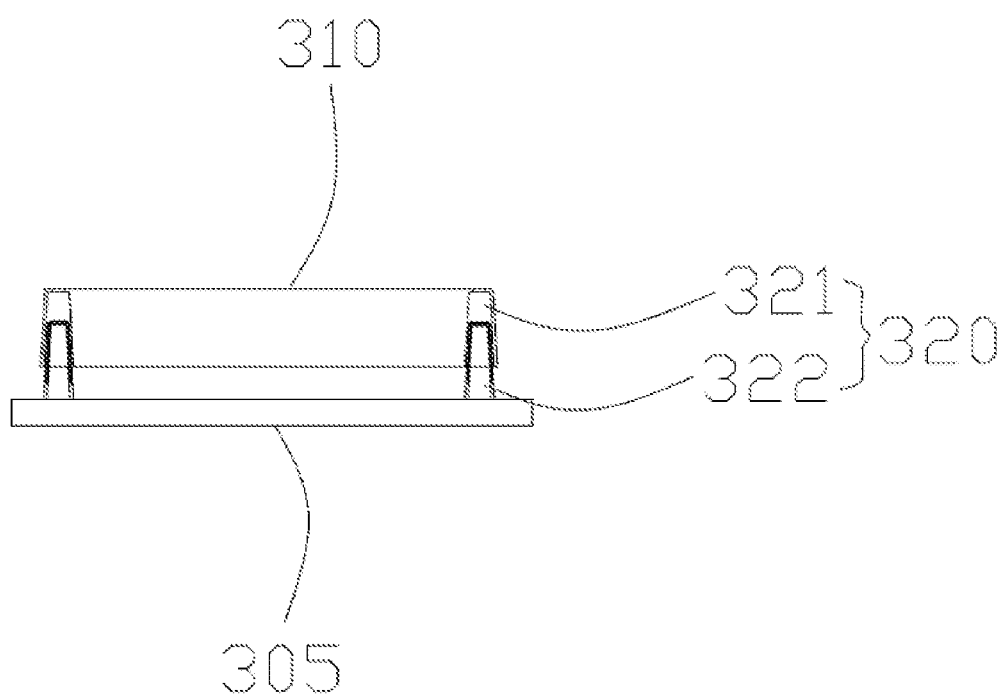
FIG. 5 is a schematic diagram of a single-layer circuit board spaced apart on a circuit board bracket in a vehicle-mounted recording component which is convenient to assemble and disassemble provided by the embodiment of the present application.
Figure 6:
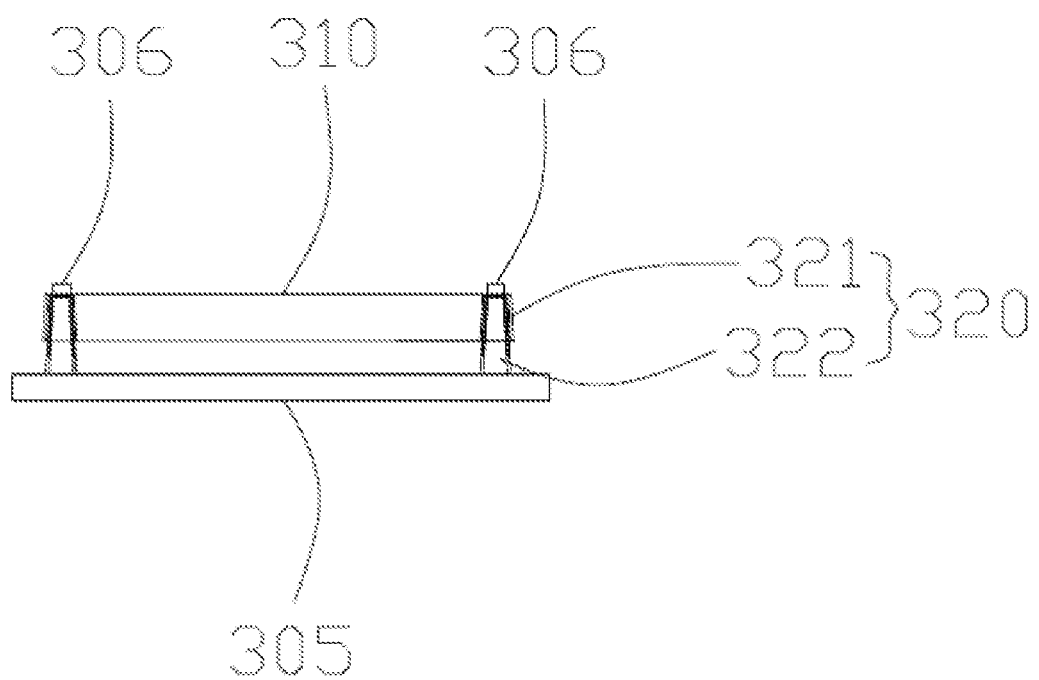
FIG. 6 is a schematic side view of a limit structure in the vehicle-mounted recording component which is convenient to assemble and disassemble provided by the embodiment of the present application.
Figure 7:
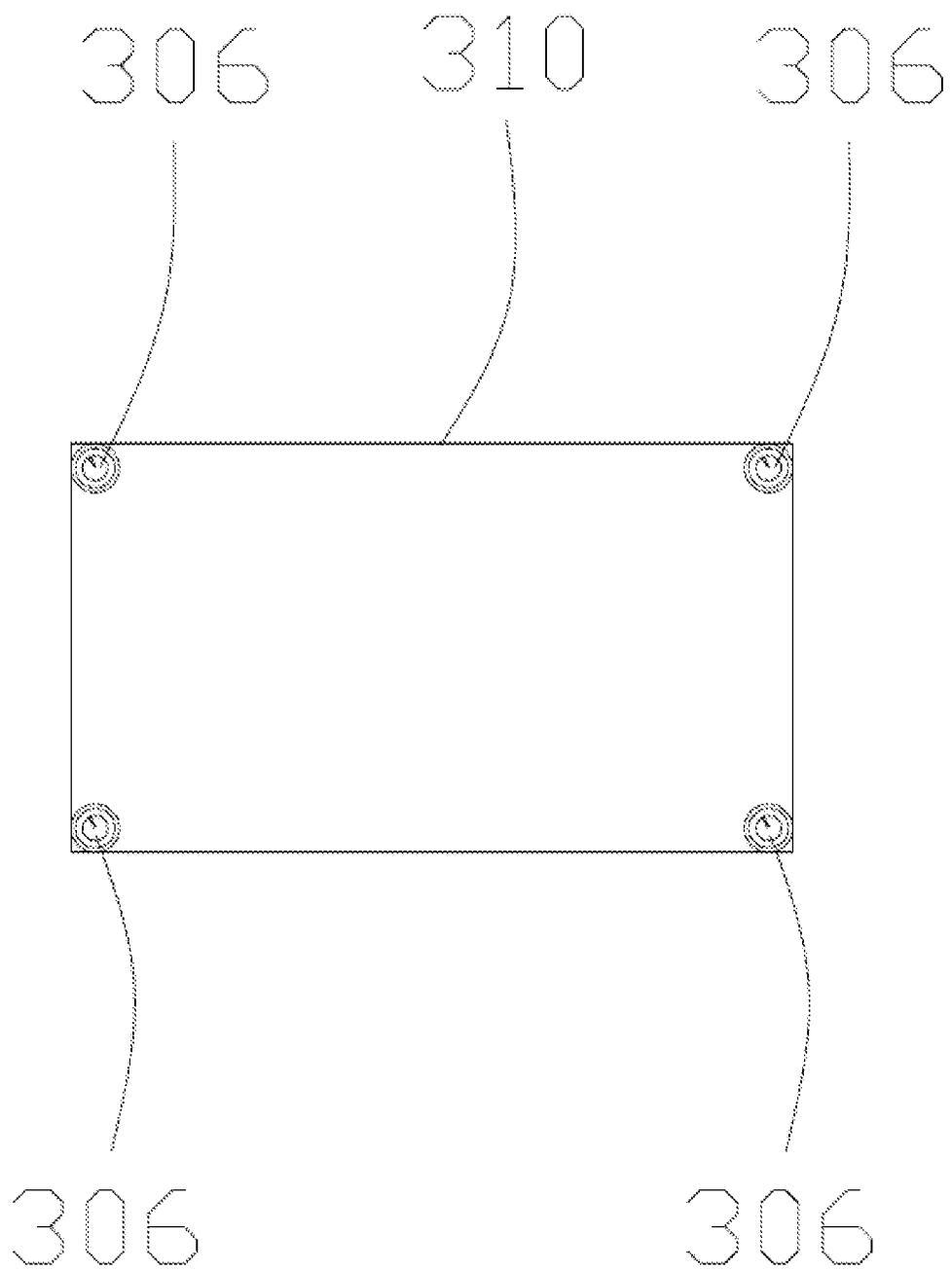
FIG. 7 is a top view of the limit structure in the vehicle-mounted recording component which is convenient to assemble and disassemble provided by the embodiment of the present application.
Figure 8:
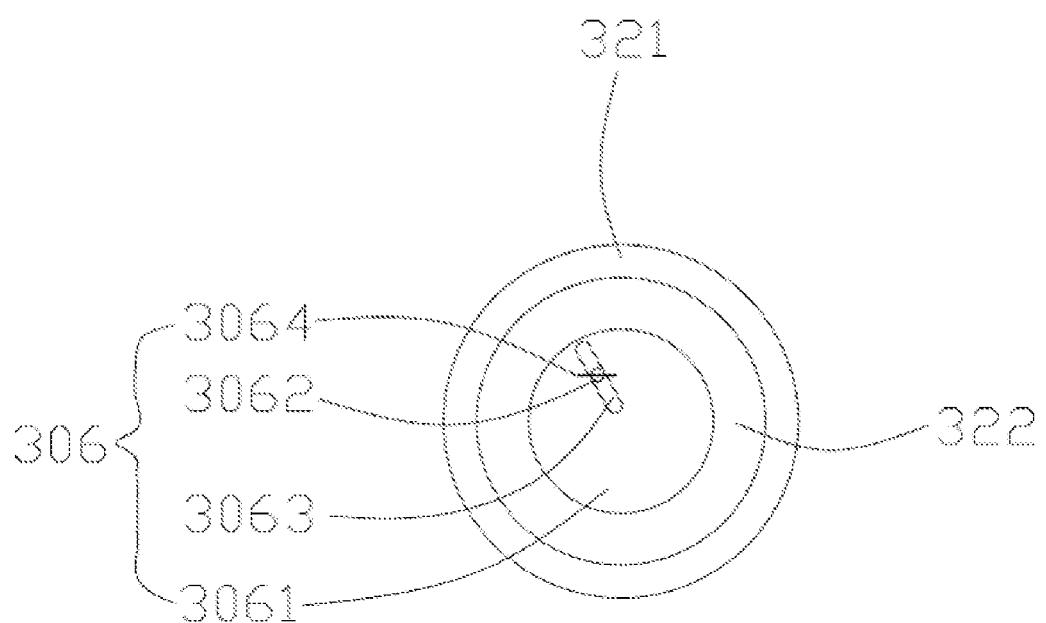
FIG. 8 is an enlarged view of the limit structure in the vehicle-mounted recording component which is convenient to assemble and disassemble provided by the embodiment of the present application.
Figure 9:
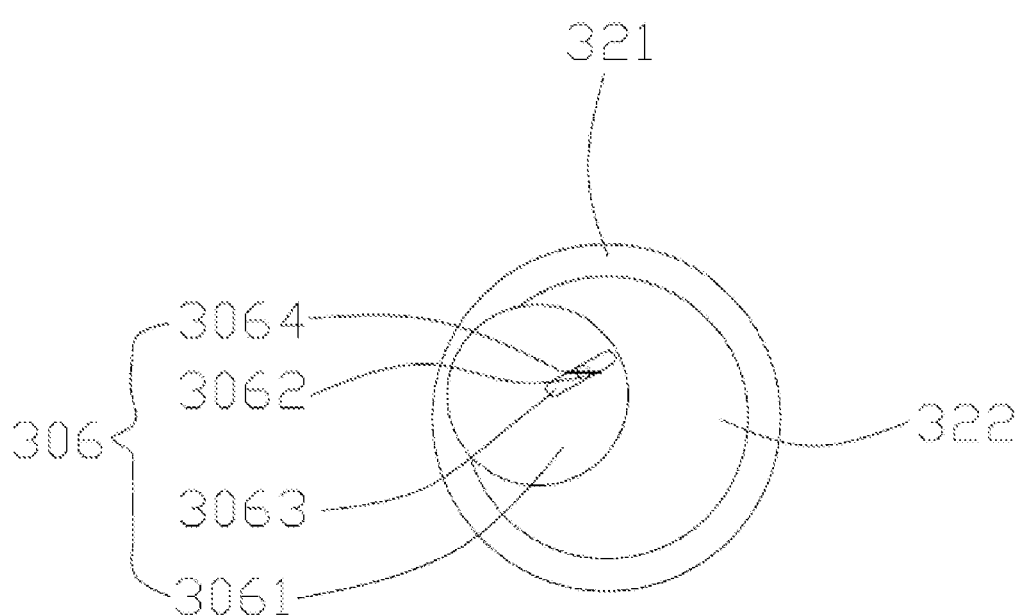
FIG. 9 is a schematic diagram of a position limiting structure in the vehicle-mounted recording component provided by the embodiment of the present application for limiting the circuit board after rotating.
Figure 11:
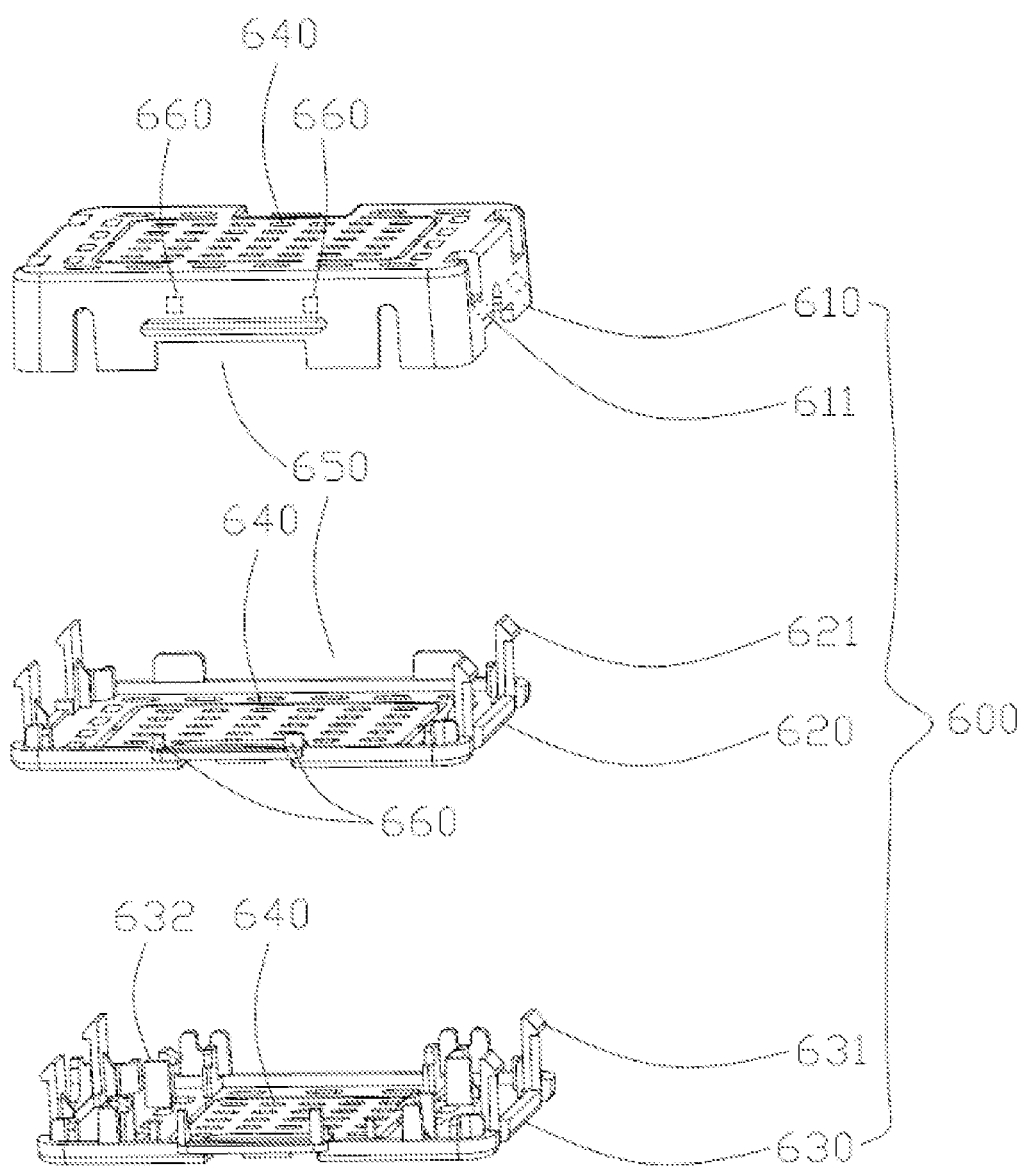
FIG. 11 is an exploded schematic view of a shielding structure in the vehicle-mounted recording component provided by the embodiment of the present application.

As an example, the shielding structure is as follows:

as shown in FIG. 2 and FIG. 11, further, the vehicle-mounted recording component includes a shielding structure 600 capable of preventing the circuit board 310 from radiating to the outside, in this embodiment, the processing terminal 300 is arranged in the shielding structure 600, the image terminal 100 and the operation terminal 200 are installed on both sides of the processing terminal 300 and are both located outside the shielding structure 600, the processing terminal 300 and the shielding structure 600 are connected in a detachable manner; the shielding structure 600 is detachably installed in the housing 400, and the detachable connection modes include clamping, screwing, etc. In this embodiment, the preferred mode is snap connection.

More specifically, the shielding structure 600 includes an upper shielding housing 610 and a lower shielding housing 620 which are detachably connected, two inverted L-shaped second clamping grooves 611 are respectively defined at both ends of the upper shielding housing 610, the two ends of the lower shielding housing 620 are respectively provided with inverted L-shaped hooks 621 which are matched with the second clamping grooves 611, the second clamping groove 611 and the hook 621 mainly longitudinally limit the upper shielding housing 610 and the lower shielding housing 620; in case of applying a thrust to the hook 621, the hook 621 is bent and deformed, and inserted into the clamping groove to limit the upper shielding housing 610. In case of applying a pulling force to the hook 621, the hook is bent and deformed, and is pulled out from the clamping groove, so that the shielding housing is simple to disassemble and convenient to install.

Specifically, both sides of the upper shielding housing 610 and the lower shielding housing 620 are respectively provided with a limiting boss 650 and a limiting groove 660, the limiting boss 650 and the limiting groove 660 cooperate to limit the upper shielding housing 610 and the lower shielding housing 620 laterally. In this embodiment, the limiting bosses 650 are embedded in the limiting grooves 660, two limiting bosses 650 are arranged on one side of the upper shielding housing 610, and the limiting grooves 660 are arranged on the other side (dotted lines) of the upper shielding housing. Two limiting bosses 650 that may be embedded in the limiting groove 660 of the upper shield housing 610 are defined on one side of the lower shield housing 620; on the other side of the lower shielding housing, a limiting groove 660 is defined, which may be used for embedding the limiting boss 650 of the upper shielding housing 610.

The upper shielding housing 610 and lower shielding housing 620 may be firmly connected together through longitudinal and transverse limits, ensuring stable and reliable connection. Moreover, the upper shielding housing 610 and the lower shielding housing 620 are wrapped around a periphery of the circuit board 310, playing a role in protecting the circuit board 310 and avoiding damage to the circuit board 310 caused by automobile collisions; the upper shielding housing 610 and the lower shielding housing 620 are made of metal materials, which may effectively shield signals.

Specifically, the shielding structure 600 further includes a support housing 630 for limiting the circuit board 310 in the shielding structure 600, in this embodiment, the support housing 630 is arranged below the lower shielding housing 620, L-shaped hooks 631 for detachable connection with the upper shielding housing 610 or the lower shielding housing 620 are respectively arranged at both ends of the support housing 630, a limit column 632 for positioning the circuit board is also fixedly arranged on the support housing 630, the circuit board 310 is spaced apart from the upper shielding housing 610 and the lower shielding housing 620 by limit columns 632, which is not only beneficial to heat dissipation, but also convenient to arrange components with different heights on the circuit board 310, so it has strong applicability.

Specifically, second radiating holes 640 are defined on the upper shielding housing 610, the lower shielding housing 620 and the support housing 630, the second radiating hole 640 may enhance ventilation and heat dissipation.

The shielding structure 600 is made of metal, and may be made of tin, copper or steel, thereby reducing radiation.

In order to adapt to different sizes of housing 400 and meet the usage needs of different automotive users. In the case of small accommodation area of the housing 400, the length of the first cable 230 between the image terminal 100 and the circuit board 310 and the length of the second cable 140 between the operation terminal 200 and the circuit board 310 may be reduced respectively, in the case of large accommodation area of the housing 400, the lengths of the first cable 230 and the second cable 140 may be increased respectively.

As an example, the structure of the storage unit is as follows:

As shown in FIG. 2, further, the vehicle-mounted recording component includes a storage unit 700 connected to the circuit board 310 and capable of storing images and sounds.

Specifically, the storage unit 700 includes a card holder 710 with a card slot 711 and a memory card 720 slidably inserted in the card holder 710. The card slot 711 extends to the outside of the housing 400 to facilitate the installation or replacement of the memory card 720. The memory card 720 plays the role of capacity expansion, so as to store the video recorded by the image terminal 100, and there is no need to add an additional memory card.

In case that the data stored on the memory card 720 is full, an alarm 350 connected to the circuit board 310 may sound an alarm to remind users to replace the memory card 720, or the memory card automatically overwrites the data, that is, the memory card 720 may save the data in a certain fixed period of time.

As an example, the structure of peripheral components of the circuit board is as follows:

Further, a power supply 800 capable of supplying power to the circuit board 310 is arranged outside the circuit board 310, the power supply 800 includes a power connector 810, a capacitor connector 820 and a charging power supply 830.

The priority of power supply between power connector 810, capacitor connector 820 and charging power supply 830 is as follows. Firstly, the top priority for power supply is the power connector 810 connected to the vehicle-mounted power supply; the second priority for power supply is the capacitor connector 820 connected to the built-in capacitor 380, in case that the automobile cuts off the power supply to the circuit board 310, the built-in capacitor 380 supplies power to the circuit board 310 to ensure that the circuit board 310 may work normally. Finally, in case that the power supply of the automobile is cut off and the capacitor connector 820 is unable to provide power supply, the charging power supply 830 supplies power to the circuit board 310. The power connector 810 may not only supply power to the circuit board 310, but also charge the charging power supply 830 and the built-in capacitor 380 connected with the capacitor connector 820. In this embodiment, the charging power supply 830 is preferably a rechargeable battery.

Further, the circuit board 310 is internally provided with a built-in capacitor 380, in case that an automobile collides, it may trigger the emergency protection function and cause power failure, which may cause the vehicle-mounted recording component which is convenient to assemble and disassemble to lose the shooting function. The built-in capacitor has the function of emergency power-off protection, and may provide temporary power supply, so that the vehicle-mounted recording component which is convenient to assemble and disassemble may also normally shoot video after the sound collision of the automobile and store the video through the memory card 720.

The circuit board 310 is coated with a heat dissipation adhesive layer 390 in contact with the shielding structure 600, in this embodiment, a material of the heat dissipation adhesive layer 390 is preferably heat dissipation silica gel, and heat is transmitted to the shielding structure 600 of metal materials through the heat dissipation adhesive layer, which improves the heat dissipation efficiency.

Further, the outer side of circuit board 310 is further provided with a sound connector 330 and a signal transceiver connector 340 that are electrically connected to the circuit board, the power supply 800 and the sound connector 330 are respectively installed on both sides of the signal transceiver connector 340, the spacing design of the power supply 800, sound connector 330, and signal transceiver connector 340 facilitates heat dissipation between various components.

Further, the processing terminal 300 is connected with an external device in a wired or wireless manner to transmit or receive a video signal or an audio signal, in this embodiment, Bluetooth connection is preferred.

Further, a speaker connector 360 and an antenna connector 370 are arranged on the circuit board 310, both the speaker connector 360 and the antenna connector 370 are electrically connected to the circuit board 310.

In this embodiment, the speaker connector 360 is connected with a speaker, the antenna connector 370 is connected with an antenna, the speaker is used to play sound information, and the antenna is a positioning antenna, which is used to determine the address, coordinates and driving trajectory of the event recorded by the vehicle-mounted recording component which is convenient to disassemble and assemble. The antenna may also be a Bluetooth antenna, which is connected to the mobile terminal. The real-time data of the mobile terminal may also determine the position information of the vehicle, and sound information, such as music or navigation information, may be played through the speaker.

Specifically, the power connector 810, the capacitor connector 820, the speaker connector 360 and the antenna connector 370 all adopt anti-reverse connection design. The circuit board 310 is provided with a fuse, which may protect the circuit board 310 from burning when the power supply voltage fluctuates. The power connector 810, the capacitor connector 820, the speaker connector 360 and the antenna connector 370 all adopt anti-reverse connection design, which ensures the consistency of positive and negative poles between the power supply and each connector, protects the circuit board 310, and solves the potential safety hazard caused by abnormal connection.

As an example, the structure of the image terminal is as follows:

Further, the image terminal 100 includes a lens board connector 110 electrically connected to the circuit board 310 and a lens line connector 120, where the lens line connector may rotate relative to the lens board connector 110 and is clamped to the lens board connector 110. Preferably, the lens line connector 120 is sleeved on the periphery of the lens board connector 110.

The lens board connector 110 is connected with the lens sensor 160 through the third cable 150, and the lens line connector 120 rotates around the lens board connector 110 to an open position. After the third cable 150 is placed at the position corresponding to the pins on the lens board connector 110, the lens line connector 120 rotates to the position where it is locked with the lens board connector 110, thus completing the fixed limiting of the third cable 150.

Figure 12:
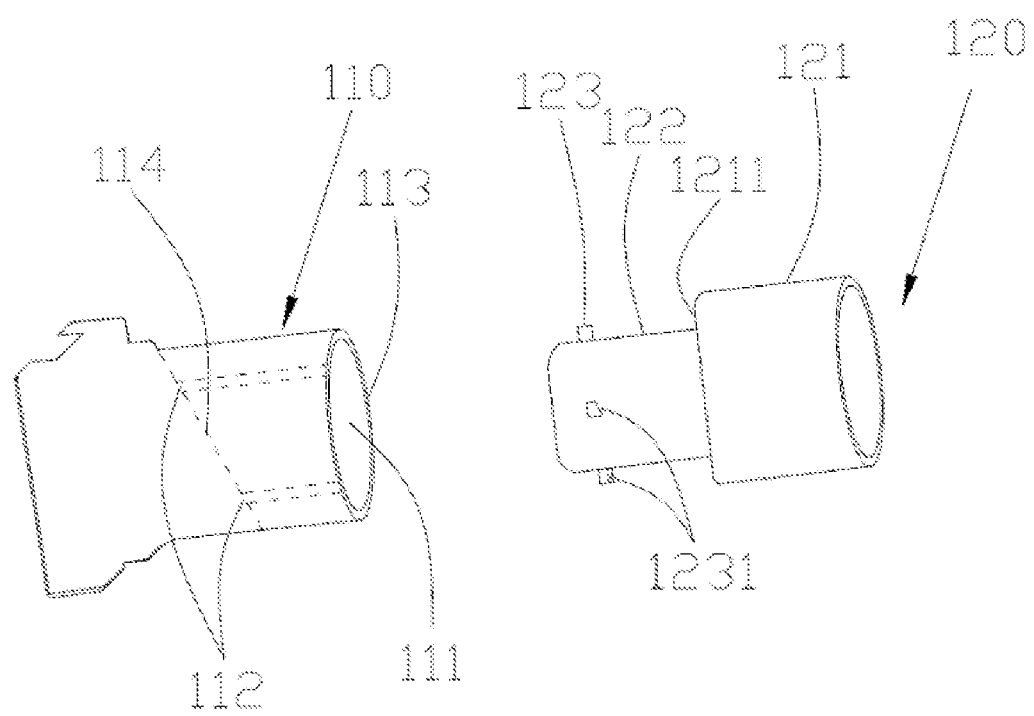
FIG. 12 is an exploded schematic view of a lens board connector sleeved on a periphery of a lens line connector in the vehicle-mounted recording component which is convenient to assemble and disassemble provided by the embodiment of the application.

As shown in FIG. 12, in another embodiment, the lens board connector 110 may also be sleeved on the periphery of the lens line connector 120, and the specific structure is as follows:

The lens line connector 120 includes a hollow large-end cylindrical body 121 and a hollow small-end cylindrical body 122 coaxially arranged with the large-end cylindrical body 121. An outer peripheral surface of the end of the small-end cylindrical body 122 is provided with a projection 123 for limiting, and the projection 123 is provided with a guide surface 1231 for limiting. In this embodiment, four protrusions 123 are preferably arranged in a 360-degree ring on the outer peripheral surface of the small-end cylindrical body 122. The lens board connector 110 has a through hole 111 through which a small-end cylindrical body 122 may pass, and a through groove 112 through which a protrusion 123 may pass. The two ends of the through hole 111 are respectively provided with an outer side surface 113 and a rotating surface 114, wherein the outer side surface abuts against the inner side surface 1211 of the large-end cylindrical body 121, and the rotating surface 114 engages with the guide surface 1231 to move and lock each other during rotation.

In case that the protrusion 123 passes through the through groove 112 and applies a circumferential torque clockwise to the large-end cylindrical body 121 of the lens line connector 120, the outer side surface 113 abuts against the inner side surface 1211 of the large-end cylindrical body 121, and the guide surface 1231 engages with the rotating surface 114 to move and lock each other. On the contrary, when a circumferential torque in the counterclockwise direction is applied to the lens line connector 120, the lens line connector 120 may be detached from the lens board connector 110, with this structure, the installation is simple and the disassembly is convenient.

In this embodiment, the image terminal 100 includes a lens board connecting frame 130 electrically connected with the circuit board 310, the lens board connector 110 is detachably mounted on the lens board connecting frame 130, the connection mode is preferably snap connection, which is simple to disassemble and convenient to install.

The lens board connector 110 is used to connect the lens sensor 160, the lens sensor 160 may be a camera or a radar, and is preferably a camera in this embodiment. The lens board connector 110 receives data transmitted by the lens sensor and transmits it to the circuit board 310 for processing, the circuit board 310 stores the processed data in the memory card 720.

Preferably, the image terminal 100 has two cameras, one for shooting the video in front of the automobile and the other for shooting the video in and/or behind the automobile.

As an example, the operation terminal structure is as follows:

Specifically, the operation terminal 200 includes a keypad connector 210 and a keypad wire connector 220 which are electrically connected with the circuit board 310, wherein the keypad wire connector 220 rotates relative to the keypad connector 210 and is fastened to the keypad connector 210.

The keypad connector 210 and the circuit board 310 are connected by welding, specifically, the pins of the keypad connector 210 and the reserved holes of the circuit board 310 are soldered together by dielectric tin, the keypad connector 210 is rotatably connected with the keypad wire connector 220, and the keypad wire connector 220 is connected with the keys 250 through the fourth cable 240. The keypad wire connector 220 rotates around the keypad connector 210 to an open position. After the fourth cable is placed at the position corresponding to the pin of the keypad connector 210, the keypad wire connector 220 rotates to the position where it engages with the keypad connector 210, thus completing the fixing and limiting of the fourth cable 240.

Further, the processing terminal 300 is connected with the automobile power supply through a telescopic wire 900, the telescopic wire 900 is lengthened or shortened to install the vehicle-mounted recording assembly which is convenient to disassemble and assemble at the required position, the telescopic wire structure is common knowledge, so it is not repeated here.

A vehicle-mounted recording component which is convenient to assemble and disassemble, including an image terminal 100 for recording image and sounds, an operation terminal 200 for outputting control instruction signals and a processing terminal 300 for processing the recorded images and sounds according to the received control instruction signals, the processing terminal 300 includes a circuit board 310 and a guide structure 320 capable of quickly installing the circuit board 310. The guide structure 320 has a tapered guide hole 321 and a tapered guide column 322 that cooperate with each other; in case of installing a single-layer circuit board 310, the tapered guide hole 321 and the tapered guide column 322 are respectively arranged on the circuit board 310 and the circuit board bracket 305; in case of installing a double-layer circuit board, the tapered guide hole 321 and tapered guide column 322 are respectively arranged on the two circuit boards 310; after the tapered guide hole 321 and the tapered guide column 322 are matched, the circuit board 310 may be quickly installed on the circuit board bracket 305 or another circuit board 310, the installation is simple, the disassembly is convenient, the assembly process is reduced, and the production cost is reduced. Moreover, it avoids the following phenomenon in the conventional technology, that is, the vehicle-mounted recording component needs accurate hole alignment, and then the single circuit board is mounted on the bracket by rotating screws or the double circuit boards are mounted together, resulting in inconvenient disassembly and assembly. A vehicle-mounted recording device with a vehicle-mounted recording component is further provided according to the present application, which has good usability.

The above is the preferred embodiment of the present application, and it should be noted that for those skilled in the technical field, several improvements and embellishments can be made without departing from the principles of this application, and these improvements and embellishments are also regarded as the protection scope of this application.

What is claimed is:

1. A vehicle-mounted recording component with convenient disassembly and assembly, comprising:
    an image terminal for recording images and sounds;
    an operation terminal for outputting a control instruction signal;
    a processing terminal for processing the recorded images and sounds according to the received control instruction signal, which is respectively connected with the image terminal and the operation terminal, the processing terminal comprises a circuit board and a guide structure capable of quickly installing the circuit board;
    a power supply capable of supplying power to the circuit board is provided on an outside of the circuit board, and the power supply is electrically connected to the circuit board;
    the outside of the circuit board is further provided with a sound connector and a signal transceiver connector which are both electrically connected with the circuit board, the power supply and the sound connector are respectively arranged at two sides of the signal transceiver connector.

2. The vehicle-mounted recording component with convenient disassembly and assembly according to claim 1, wherein the guide structure comprises a tapered guide hole and a guide column slidably arranged in the tapered guide hole.

3. The vehicle-mounted recording component with convenient disassembly and assembly according to claim 2, wherein there are two circuit boards spaced apart, and the tapered guide holes and tapered guide columns are respectively arranged on the two circuit boards.

4. The vehicle-mounted recording component with convenient disassembly and assembly according to claim 1, comprising a shielding structure capable of preventing the circuit board from radiating to the outside.

5. The vehicle-mounted recording component with convenient disassembly and assembly according to claim 1, comprising a storage unit connected to the circuit board and capable of storing images and sounds.

6. The vehicle-mounted recording component with convenient disassembly and assembly according to claim 5, wherein the storage unit comprises a card holder with a card slot and a memory card slidably inserted in the card holder.

7. The vehicle-mounted recording component with convenient disassembly and assembly according to claim 1, wherein the image terminal comprises a lens board connector and a lens line connector which are electrically connected with the circuit board, the lens line connector may rotate relative to the lens board connector and be clamped on the lens board connector.

8. The vehicle-mounted recording component with convenient disassembly and assembly according to claim 7, wherein the lens board connector is sleeved externally or internally on the lens wire connector.

9. The vehicle-mounted recording component with convenient disassembly and assembly according to claim 1, wherein the operation terminal comprises a key board connector and a key wire connector electrically connected with the circuit board, the key wire connector rotates relative to the key board connector and is clamped on the key board connector.

10. The vehicle-mounted recording component with convenient disassembly and assembly according to claim 1, wherein a built-in capacitor for emergency power supply is arranged in the circuit board.

11. The vehicle-mounted recording component with convenient disassembly and assembly according to claim 1, wherein the circuit board is coated with a heat dissipation adhesive layer which is in contact with a rigid shielding structure.

12. The vehicle-mounted recording component with convenient disassembly and assembly according to claim 1, wherein the processing terminal is connected with an external device through wired or wireless mode to transmit or receive video signals or audio signals.

13. A vehicle-mounted device, comprising:
    a vehicle-mounted recording component comprising:
        an image terminal for recording images and sounds;
        an operation terminal for outputting a control instruction signal;
        a processing terminal for processing the recorded images and sounds according to the received control instruction signal, which is respectively connected with the image terminal and the operation terminal, the processing terminal comprises a circuit board and a guide structure capable of quickly installing the circuit board;

a power supply capable of supplying power to the circuit board is provided on an outside of the circuit board, and the power supply is electrically connected to the circuit board;

the outside of the circuit board is further provided with a sound connector and a signal transceiver connector which are both electrically connected with the circuit board, the power supply and the sound connector are respectively arranged at two sides of the signal transceiver connector;

a housing accommodated the vehicle-mounted recording component;

a soft rubber pad installed at a bottom of the housing for sticking on a glass.

* * * * *